US008494515B1

(12) United States Patent  
Elkady

(10) Patent No.: US 8,494,515 B1  
(45) Date of Patent: Jul. 23, 2013

(54) SYSTEMS, METHODS, AND COMPUTER-READABLE MEDIA FOR MANAGING MOBILE WIRELESS DEVICES

(75) Inventor: Amr Elkady, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 914 days.

(21) Appl. No.: 11/956,474

(22) Filed: Dec. 14, 2007

Related U.S. Application Data

(60) Provisional application No. 60/919,353, filed on Mar. 22, 2007.

(51) Int. Cl.
*H04W 4/00* (2009.01)

(52) U.S. Cl.
USPC ..... 455/432.2; 455/411; 455/466; 455/414.1; 455/414.2; 455/406; 370/328; 370/241

(58) Field of Classification Search
USPC ............... 455/414.1, 412.1, 552.1, 41.2, 406, 455/426.2, 432, 466, 411; 370/328, 338, 370/401, 241
See application file for complete search history.

(56) References Cited

U.S. PATENT DOCUMENTS

| | | | |
|---|---|---|---|
| 6,411,802 B1 | 6/2002 | Cardina et al. | |
| 2002/0087722 A1 | 7/2002 | Datta et al. | |
| 2002/0095484 A1 | 7/2002 | Pagani et al. | |
| 2004/0004968 A1 | 1/2004 | Nassar | |
| 2004/0179512 A1 | 9/2004 | Leblanc et al. | |
| 2005/0111398 A1 * | 5/2005 | Wybenga et al. | 370/328 |
| 2006/0077921 A1 | 4/2006 | Radpour | |
| 2006/0098614 A1 | 5/2006 | Moon et al. | |
| 2006/0182111 A1 | 8/2006 | Wahl | |
| 2007/0025246 A1 | 2/2007 | Pirzada et al. | |
| 2007/0104169 A1 | 5/2007 | Polson | |
| 2007/0249323 A1 * | 10/2007 | Lee et al. | 455/411 |
| 2007/0253417 A1 | 11/2007 | Purnandi et al. | |
| 2007/0254634 A1 | 11/2007 | Costa-Requena et al. | |
| 2008/0008125 A1 | 1/2008 | Pham et al. | |
| 2008/0049623 A1 * | 2/2008 | Qiu et al. | 370/241 |

OTHER PUBLICATIONS

Bernstein et al, Technical Report DSL Forum TR-069 CPE WAN Management Protocol, May 2004.*
Bernstein et al., Tehcnical Report DSL Forum TR-069 CPE WAN Management Protocol, May 2004.*
U.S. Appl. No. 11/956,465, filed Dec. 14, 2007, entitled: "Systems, Methods, and Computer-Readable Media for Communicating Via a Mobile Wireless Communication Device", Inventors: Amr Elkady and Barbara Helen Stark.
International Search Report dated Apr. 9, 2008 in International Application No. PCT/US07/87562.
U.S. Official Action dated Oct. 26, 2010 in U.S. Appl. No. 11/956,465.
U.S. Official Action dated Apr. 4, 2011 in U.S. Appl. No. 11/956,465.
U.S. Notice of Allowance dated Dec. 23, 2011 in U.S. Appl. No. 11/956,465.

* cited by examiner

*Primary Examiner* — Manpreet Matharu
(74) *Attorney, Agent, or Firm* — Hartman & Citrin LLC

(57) ABSTRACT

Methods, systems, and computer-readable media are provided for managing mobile wireless communication devices. A method for managing a mobile wireless communication device includes generating a message that is based on a digital subscriber line (DSL) Forum protocol and providing the message to the mobile wireless communication device.

15 Claims, 12 Drawing Sheets

SYSTEMS, METHODS, AND COMPUTER-READABLE MEDIA FOR MANAGING MOBILE WIRELESS DEVICES

CROSS-REFERENCE TO RELATED APPLICATIONS

This patent application claims priority to U.S. provisional application having Ser. No. 60/919,353, entitled "Systems, Methods, and Computer-Readable Media for Managing Dual-Mode User Equipment for Fixed/Mobile Convergence and for Utilizing Dual-Mode User Equipment for Home Network Access," filed Mar. 22, 2007, which is hereby incorporated herein by reference in its entirety.

TECHNICAL FIELD

This application relates generally to the field of telecommunications. More specifically, this application relates to systems and methods for managing mobile wireless devices.

BACKGROUND

A mobile telephone (commonly, "mobile phone" or "cell phone") is a long-range, portable electronic device used for mobile communication. In addition to the standard voice function of a telephone, current mobile phones can support many additional services such as short message service (SMS) for text messaging, e-mail, packet switching for access to the Internet, and multi-media messaging service (MMS) for sending and receiving photos and video. An example of a mobile phone is a dual-mode phone which performs as a cell phone when outside of a user's residence or beyond a wireless local area network connection and as a voice over IP (VoIP) phone when within a user's residence or within a wireless local area network connection.

Global System for Mobile Communications (GSM) technology is used for mobile phone communications. GSM is a well established standard that offers reliable and portable services but provides little remote management features for mobile phones. Furthermore, users of GSM based devices are typically required to physically visit a communications service provider to perform various mobile phone configuration tasks.

Telecommunication companies that provide mobile phone services sometimes provide other communication services for use with customer premises equipment (CPE) located at a customer premises. The CPE may include, for example, landline telephones, wireless gateways, and computers. The services provided by the telecommunication companies in connection with the CPE may include, for example, home telephone service, VoIP, and broadband Internet access, such as via digital subscriber line (DSL) and/or cable modem technology. Managing both CPE and mobile phones as part of an integrated system can be complicated since CPE and mobile phones are typically accessed via different communication networks and using different communication technologies.

SUMMARY

Systems, methods, and computer program products for managing a mobile wireless communication device (MWCD) are provided. Exemplary embodiments of a method for managing a mobile wireless communication device include generating a message that is based on a digital subscriber line (DSL) Forum protocol and providing the message to the mobile wireless communication device.

Exemplary embodiments of a server for managing a mobile wireless communication device include a processor, and memory having program instructions stored thereon, the program instructions configured to enable the processor to generate a message that is based on a digital subscriber line (DSL) Forum protocol and provide the message to the mobile wireless communication device.

Exemplary embodiments of a computer-readable storage medium includes computer readable instructions configured to enable a computer to generate a message that is based on a digital subscriber line (DSL) Forum protocol and provide the message to a mobile wireless communication device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for managing mobile wireless devices. In the following detailed description, references are made to the accompanying drawings that form a part hereof, and which are shown by way of exemplary embodiments and implementations.

According to exemplary embodiments, a server uses a TR-069 protocol to enable a variety of functionality related to a mobile wireless communication device (MWCD). TR-069 (short for Technical Report 069) is a DSL Forum technical specification entitled CPE WAN Management Protocol (CWMP). This TR-069 technical report, which defines an application layer protocol for remote management of a customer premises equipment (CPE) such as an Internet gateway device (IGD), is hereby incorporated herein by reference in its entirety. A server may use a current or future version of TR-069, or even another DSL Forum-based protocol to communicate with and/or manage an MWCD. For example, in alternative embodiments, the server uses a TR-111 protocol to communicate with the MWCD.

Functionality provided by a server using TR-069 in connection with an MWCD includes, for example, auto-configuration and dynamic service provisioning, software and firmware image management, status and performance monitoring, configuration of local and mobile wireless communication settings, and diagnostics. Furthermore, a server may use TR-069 to enable an MWCD to provide features such as voice communications, television, data storage, Web browsing, MP3 music, e-mail, voice over IP (VoIP), and/or text messaging.

Figure 1:
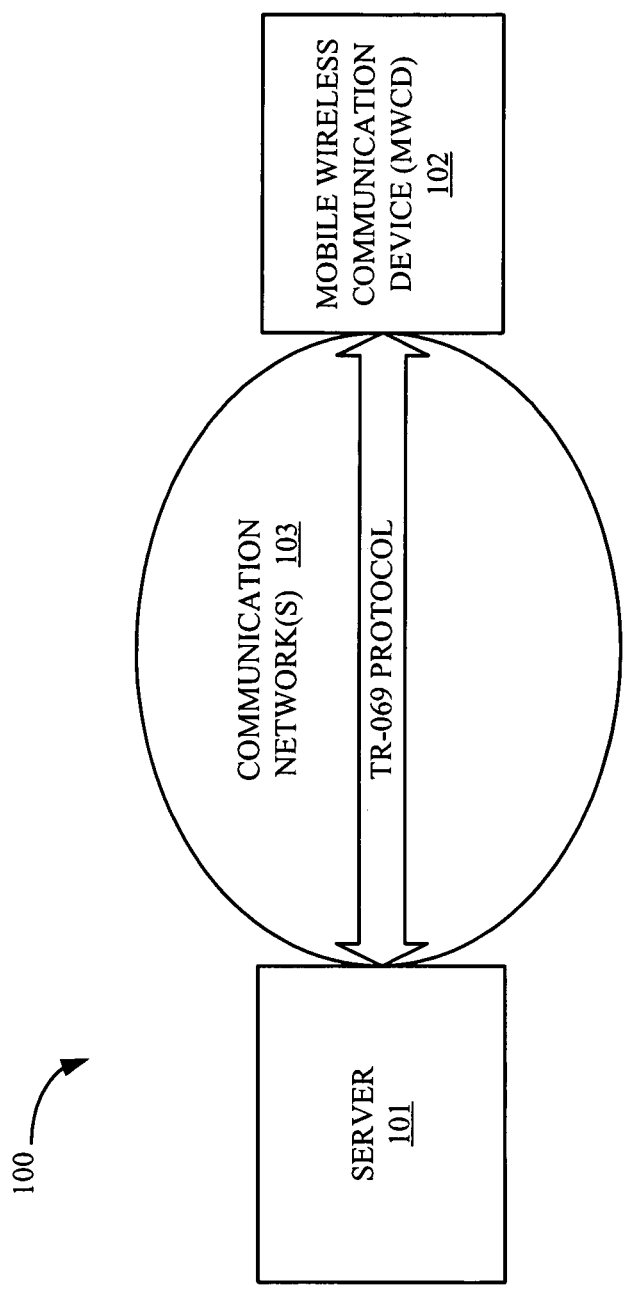
FIG. 1 is a block diagram illustrating a communication system, in accordance with exemplary embodiments.

Referring now to the drawings, it is to be understood that like numerals represent like elements through the several figures, and that not all components and/or steps described and illustrated with reference to the figures are required for all embodiments. FIG. 1 is a block diagram illustrating a communication system 100, in accordance with exemplary embodiments. As shown in FIG. 1, the communication system 100 includes a server 101 and a mobile wireless communication device (MWCD) 102 that are coupled via one or more communication network(s) 103. The communication network(s) 103 may include, for example, an internet protocol (IP) network, a public switched telephone network (PSTN), a public land mobile network (PLMN), and/or a mobile wireless network, depending on a desired implementation. Non-IP networks that are part of the communication networks 103 may be configured to transparently transport IP traffic. Note that although only one server 101 and one MWCD 102 are shown for illustrative purposes, one or more of the servers 101 may be configured to communicate with one or more of the MWCDs 102. Similarly, one or more of the MWCDs 102 may be configured to communicate with one or more of the servers 101.

In exemplary embodiments, the server 101 is an auto-configuration server (ACS) and the MWCD 102 is a dual-mode user equipment (UE). A dual mode UE is a mobile wireless communication device that is capable of communicating via both a wireless local area network (LAN) technology (e.g., WiFi) and a mobile wireless technology (e.g., global system for mobile (GSM), universal mobile telephone service (UMTS), time division multiple access (TDMA), code division multiple access (CDMA), wideband CDMA (WCDMA), Cellular Digital Packet Data (CDPD), high-speed downlink packet access (HSDPA), enhanced data rates for GSM evolution (EDGE), and general packet radio services (GPRS)). In other exemplary embodiments, the MWCD 102 may alternatively be a mobile phone that is not configured to communicate via a wireless local area network technology. Note that the server 101 can be used to serve a group of the MWCDs 102 which may be associated with one or more service providers.

According to exemplary embodiments, the server 101 uses TR-069 to provision the MWCD 102 based on a variety of criteria using specific provisioning parameters. Vendor-specific provisioning capabilities may also be implemented by the server 101. The server 101 uses identification mechanisms to provision the MWCD 102 based either on the requirements of the specific MWCD 102, or based on collective criteria such as the MWCD 102 vendor, model, software/firmware version, and/or other criteria. The server 101 may also manage MWCD 102 specific components of optional applications or services for which an additional level of security is required to control, such as those involving payments.

In exemplary embodiments, the server 101 uses TR-069 to manage downloading of MWCD 102 software/firmware image files. For example, TR-069 provides mechanisms for version identification, file download initiation (e.g., server 101 initiated downloads and optional MWCD 102 initiated downloads), and notification to the server 101 of the success or failure of a file download. The server 101 may provide the MWCD 102 with individual files or a package of files along with explicit installation instructions for the MWCD 102 to perform. A signed package format can be used to ensure the integrity of downloaded files and the associated installation instructions, allowing authentication of a file source that may be a party other than the server 101 operator.

In exemplary embodiments, the server 101 uses TR-069 to monitor the MWCD 102's status and/or performance statistics. For example, TR-069 defines a common set of parameters, and provides a standard syntax for vendors to define additional non-standard parameters that the server 101 can monitor. A set of conditions can be specified under which the MWCD 102 actively notifies the server 101 of changes related to the MWCD 102. Furthermore, the server 101 may use TR-069 to obtain information that can be used to diagnose connectivity or service issues related to the MWCD 102. For example, TR-069 defines a common set of parameters and a general mechanism for adding vendor-specific diagnostic capabilities.

The server 101 may also use TR-069 to enable security functionality while managing the MWCD 102. In general terms, security goals may include, for example, preventing theft of service, allowing appropriate authentication for each type of transaction (between the MWCD 102 and the server 101), providing confidentiality for transactions, preventing tampering with transactions or server 101 management functions.

Either the server 101 or the MWCD 102 may initiate connection establishment, thereby avoiding the need for a persistent connection to be maintained between the MWCD 102 and the server 101. The functional interactions between the server 101 and the MWCD 102 may in some embodiments be independent of which end initiated the establishment of the connection. In particular, even where server 101 initiated connectivity is not supported, server 101 initiated transactions may be able to take place over a connection initiated by the MWCD 102. Each connection between the server 101 and the MWCD 102 can be used to enable bi-directional transactions to occur over a single connection.

TR-069 may be used to support discovery and association of the server 101 and the MWCD 102. For example, TR-069 may be used to provide mechanisms for enabling the MWCD 102 to discover an appropriate server 101 for a given service provider and/or enabling the server 101 to securely identify the MWCD 102 and associate the MWCD 102 with a user/ customer. Processes to support such association may support models that incorporate user interaction as well as those that are fully automatic.

The server 101 may use TR-069 to access, control and/or monitor various parameters associated with the MWCD 102. Different MWCDs 102 may have differing capability levels, implementing different subsets of optional functionality. As a result, the server 101 may be able to discover the capabilities of a particular MWCD, such as the MWCD 102, and to control and monitor a current configuration of the MWCD 102.

Other control entities besides the server 101 may be able to control some parameters of the MWCD 102's configuration. Therefore, the server 101 can be configured to account for external changes to the MWCD 102's configuration. The server 101 may also be able to control which MWCD 102 configuration parameters can be controlled via means other than by the server 101.

Figure 2:
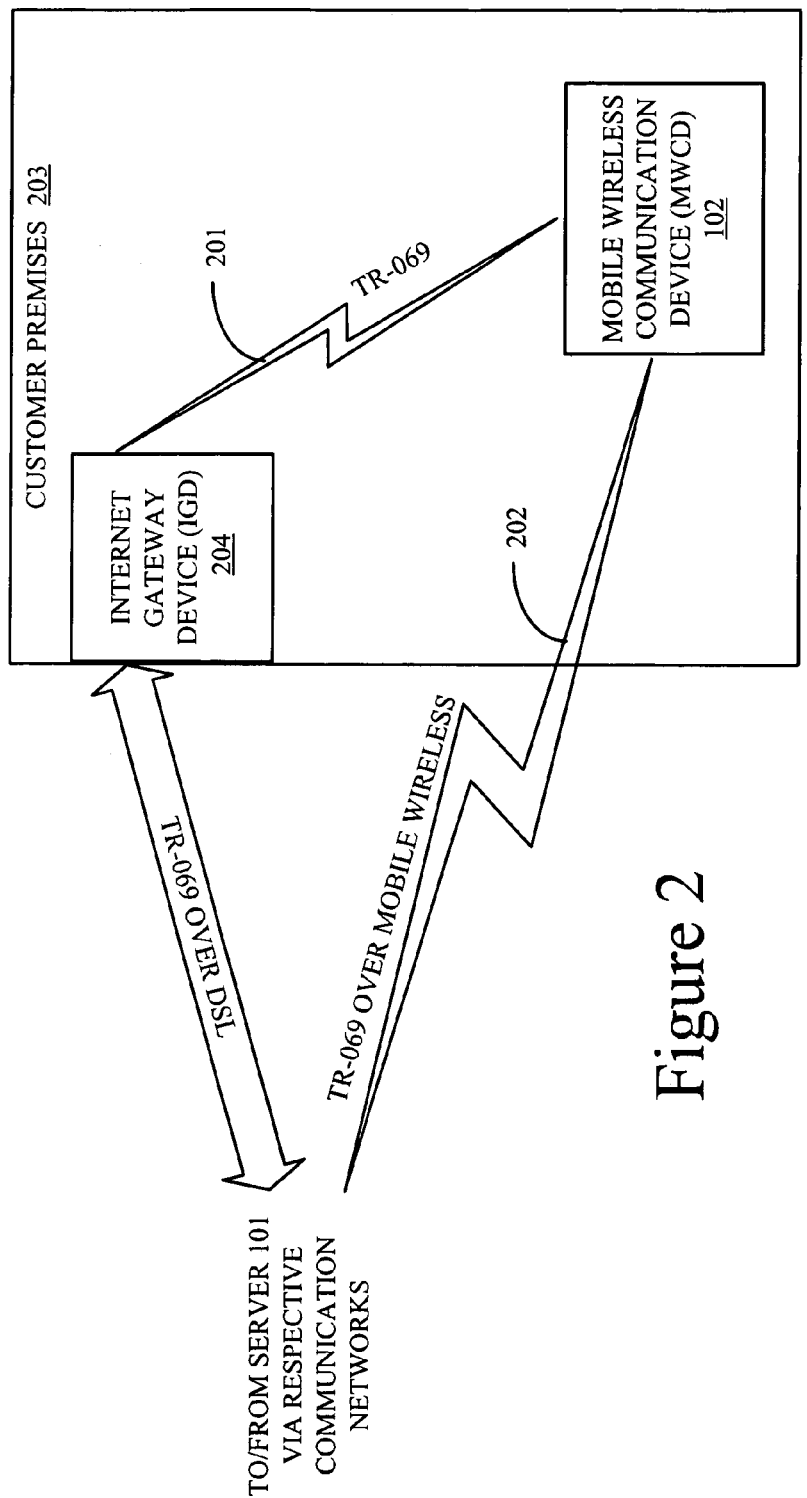
FIG. 2 is a block diagram illustrating communication channels used by a mobile wireless communication device (MWCD) of the communication system shown in FIG. 1, in accordance with exemplary embodiments.

FIG. 2 is a block diagram illustrating communication channels used by the MWCD 102, in accordance with exemplary embodiments. As shown in FIG. 2, the MWCD 102 and Internet gateway device (IGD) 204 are located at a customer premises 203. The IGD 204 acts as a communication link between the server 101 and the MWCD 102. A local wireless communication channel 201 communicatively couples the MWCD 102 and the IGD 204. The local wireless communication channel 201 may be enabled, for example, using WiFi technology. According to exemplary embodiments, the IGD 204 provides Internet access using broadband communications such as, for example, a cable modem, fiber to the x (FTTX), satellite communications, worldwide interoperability for microwave accessor (WiMax), or a digital subscriber line (xDSL) technology such as asymmetric DSL (ADSL), symmetric DSL (SDSL), or very high speed DSL (VDSL).

A mobile wireless communication channel 202 couples the MWCD 102 to a mobile wireless network (not shown in FIG. 2) that enables communication between the MWCD 102 and the server 101. The mobile wireless communication channel 202 may be enabled via one or more mobile wireless communication technologies for providing IP connectivity. Such communication technologies may include, for example, enhanced data rates for GSM evolution (EDGE) and/or general packet radio services (GPRS).

The MWCD 102 may be configured to communicate with the server 101 via the local wireless communication channel 201 and/or via the mobile wireless communication channel 202. For example, the MWCD 102 may be configured to establish a TR-069-based session with the server 101 via the local wireless communication channel 201 (e.g., WiFi enabled channel). The MWCD 102 may additionally or alternatively be configured to establish a TR-069-based session with the server 101 via the mobile wireless communication channel 202 (e.g., using EDGE/GPRS technology).

Figure 3:
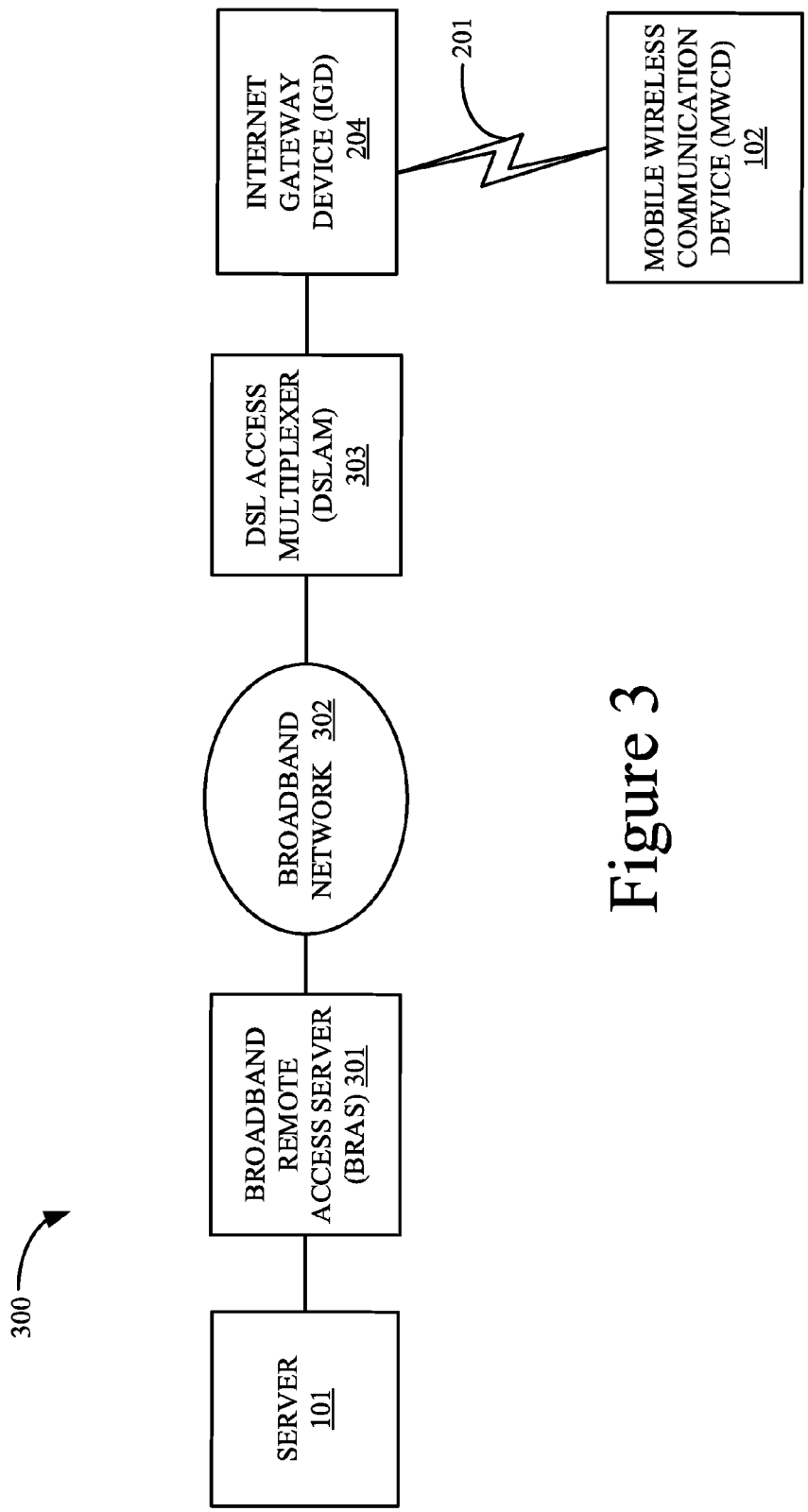
FIG. 3 is a block diagram illustrating a communication system used in connection with the MWCD shown in FIG. 1, in accordance with exemplary embodiments.

FIG. 3 is a block diagram illustrating a communication system 300, in accordance with exemplary embodiments. The communication system 300 includes the server 101, a broadband remote access server (BRAS) 301, a broadband network 302, a digital subscriber line access multiplexer (DSLAM) 303, the IGD 204, and the MWCD 102. The server 101 is coupled to the BRAS 301 which is in turn coupled to the broadband network 302. The MWCD 102 is communicatively coupled to the IGD 204 via a wireless connection. The IGD 204 is coupled to the DSLAM 303 which is in turn coupled to the broadband network 302. When the server 101 sends a message, such as a configuration parameter and/or an update, via TR-069 to the MWCD 102, the corresponding message packets are forwarded to the BRAS 301 which forwards the message packets over the broadband network 302 to the DSLAM 303. The message packets are then forwarded by the DSLAM 303 using DSL technology to the IGD 204 which wirelessly forwards the message packets via the channel 201 to the MWCD 102.

Figure 4:
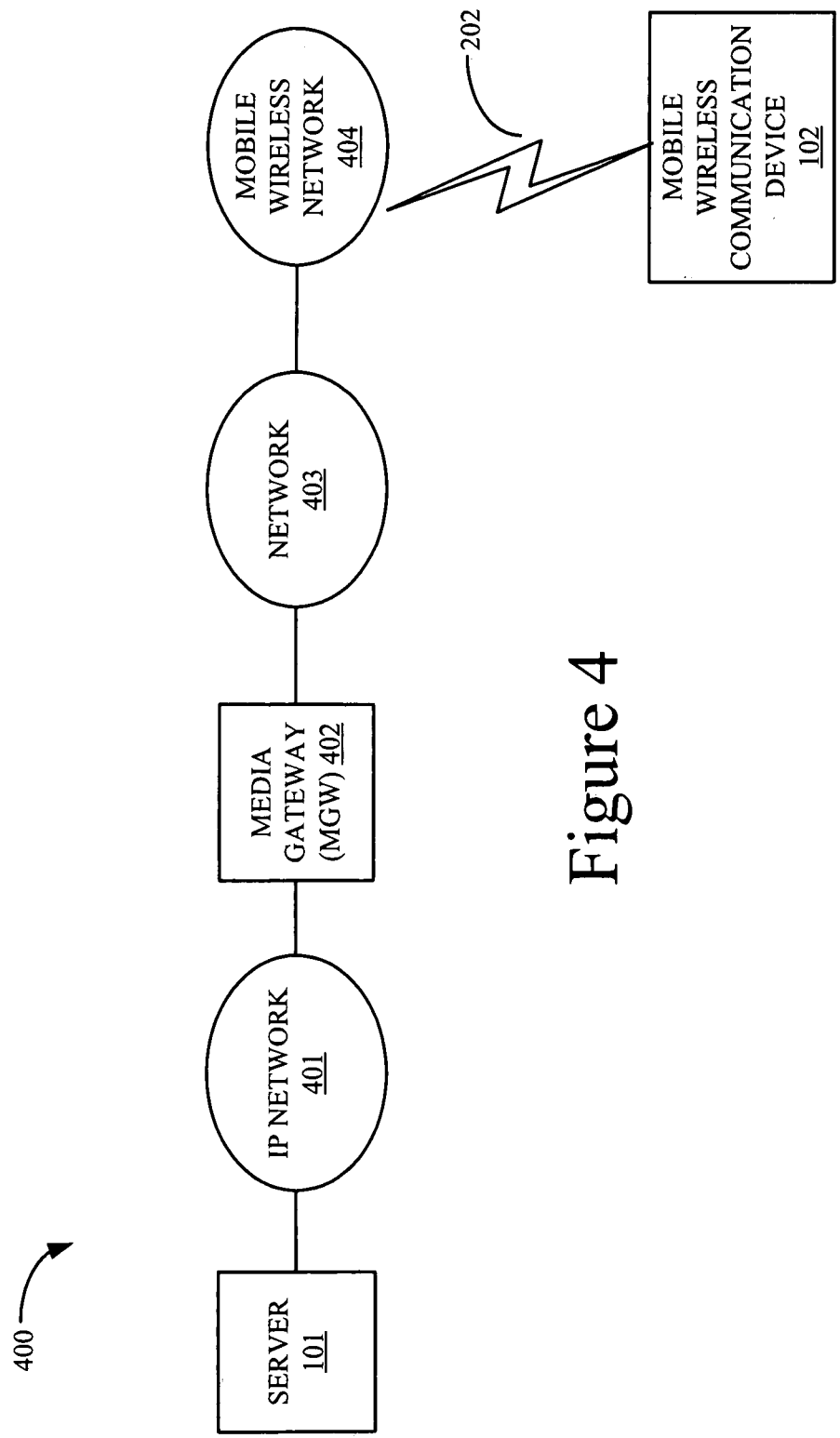
FIG. 4 is a block diagram illustrating another communication system used in connection with the MWCD shown in FIG. 1, in accordance with exemplary embodiments.

FIG. 4 is a block diagram illustrating a communication system 400, in accordance with exemplary embodiments. The communication system 400 includes the server 101, an IP network 401, a media gateway (MGW) 402, a network 403, a wireless mobile network 404, and the MWCD 102. The network 403 may be, for example, a public switched telephone network (PSTN) or a public land mobile network (PLMN). The server 101 is coupled to the IP network 401 which is in turn coupled to the MGW 402. The MGW 402 is coupled to the IP network 401 and to the network 403. The mobile wireless network 404 is coupled to the network 403. The MWCD 102 is communicatively coupled to the wireless mobile network 404 via the wireless mobile communication channel 202. When the server 101 sends a message, such as a configuration parameter and/or an update, via TR-69 to the MWCD 102, the corresponding message packets are transmitted over the IP network 401 to the MGW 402 which reformats the message packets in a way that is compatible with the network 403. The message packets are then forwarded over the network 403 to the wireless mobile network 404 which then wirelessly forwards the message packets to the MWCD 102.

Figure 5A:
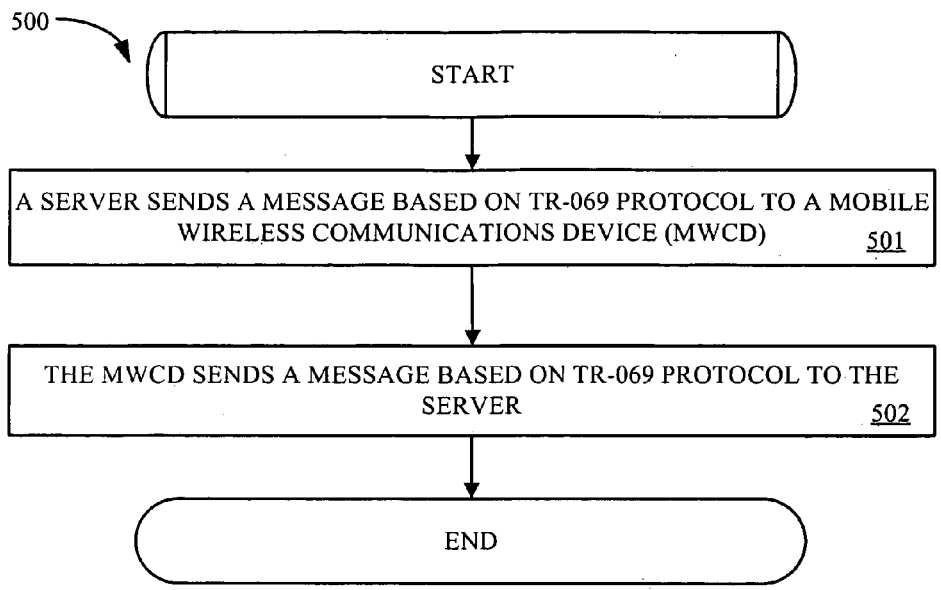
FIG. 5A is a flow chart illustrating a method for managing an MWCD, in accordance with exemplary embodiments.

FIG. 5A is a flow chart illustrating a method 500 for managing an MWCD, such as the MWCD 102, in accordance with exemplary embodiments. As indicated in block 501, a server, such as the server 101, sends a message based on TR-069 protocol to the MWCD 102. Responsive to receiving the message from the server 101, the MWCD 102 sends a message based on TR-069 protocol to the server 101, as indicated in block 502. According to method 500, the server 101 initiates communication with the MWCD 102. However, according to other exemplary embodiments, the MWCD 102 may initiate communication with the server 101 as described, for example, in FIG. 5B.

As discussed above, functionality provided by the server 101 using TR-069 in connection with the MWCD 102 include, for example, auto-configuration and dynamic service provisioning, software and firmware image management, status and performance monitoring, and diagnostics. The server 101 may use this functionality to enable the MWCD 102 to provide features such as voice communications, television, data storage, Web browsing, MP3 music, e-mail, voice over IP (VoIP), and/or text messaging.

Figure 5B:
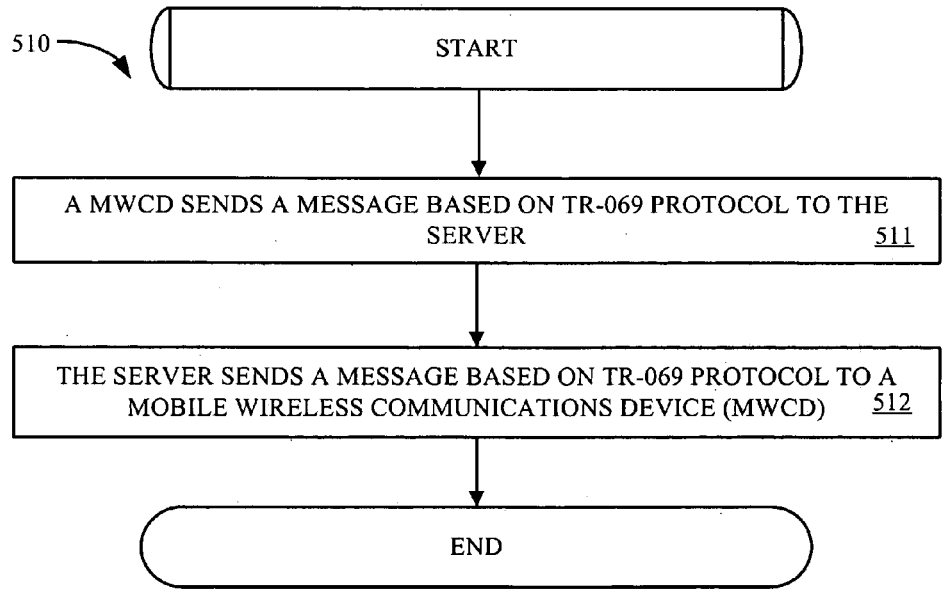
FIG. 5B is a flow chart illustrating another method for managing an MWCD, in accordance with exemplary embodiments.

FIG. 5B is a flow chart illustrating another method 510 for managing the MWCD 102, in accordance with exemplary embodiments. According to the method 510, the MWCD 102 initiates communication with the server 101. As indicated in block 511, the MWCD 102 sends a message based on TR-069 protocol to the server 101. Responsive to receiving the message from the MWCD 102, the server 101 sends a message based on TR-069 protocol to the MWCD 102, as indicated in block 512. The MWCD 102 may initiate communication with the server 101 responsive to the MWCD 102 entering a customer premises wherein the MWCD 102 is able to initiate communication via the IGD 204. For example, the MWCD 102 may send a message to the server 101 to notify the server 101 that the MWCD 102 has entered a customer premises and is capable of communicating using a wireline communication means (e.g., via DSL).

Figure 5C:
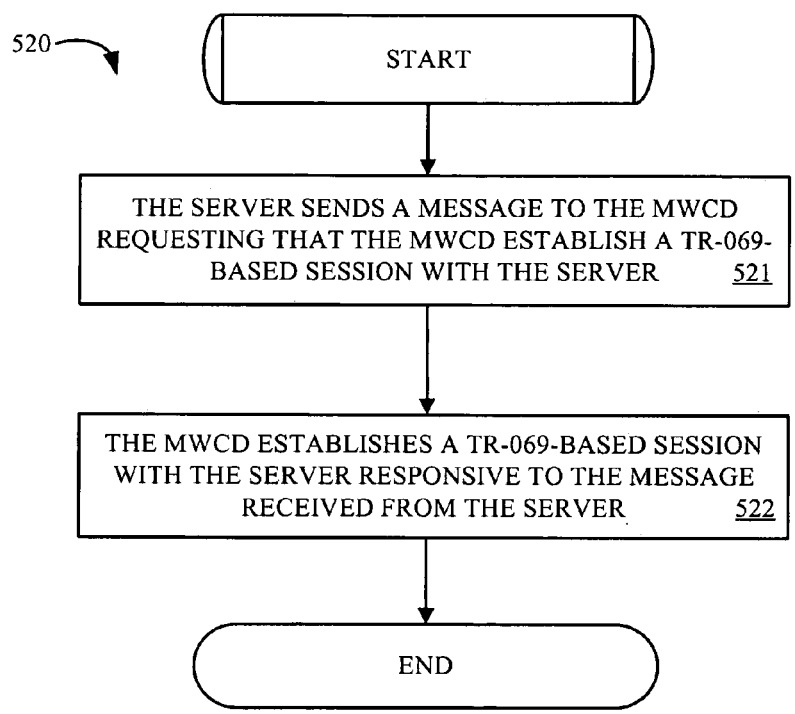
FIG. 5C is a flow chart illustrating a method for managing an MWCD, in accordance with exemplary embodiments.

FIG. 5C is a flow chart illustrating a method 520 for managing an MWCD, such as the MWCD 102, in accordance with exemplary embodiments. As indicated in block 521, the server 101 sends a message to the MWCD 102 requesting that the MWCD 102 establish a TR-069-based session with the server 101. Then, responsive to the server 101's request, the MWCD 102 establishes a TR-069-based session with the server 101, as indicated in step 522. The MWCD 102 may establish a session with the server 101 using the pre-determined server 101 address. The MWCD 102 may establish a session with the server 101 under, for example, one or more of the following conditions: on power-up or reset, once every predetermined time interval (for example, every 24-hours), and responsive to the MWCD 102 receiving a valid connection request from a server 101.

Figure 6:
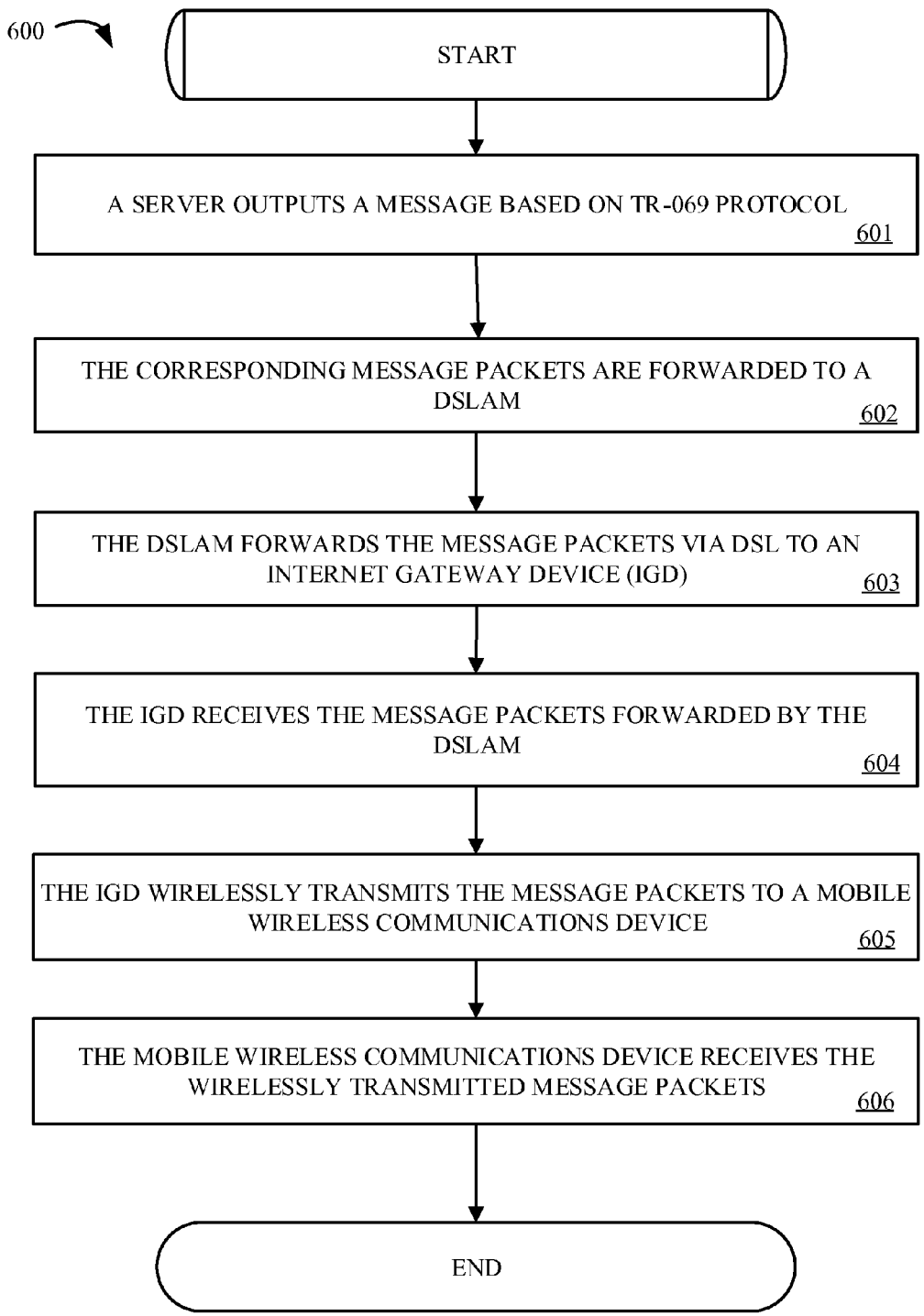
FIG. 6 is a flow chart illustrating a method for communicating with an MWCD, in accordance with exemplary embodiments.

FIG. 6 is a flow chart illustrating a communication method 600, in accordance with exemplary embodiments. The method 600 illustrates an example of steps taken in providing a message from a server, such as the server 101, to an MWCD, such as the MWCD 102, via an IGD, such as the IGD 204. As indicated in block 601, the server 101 outputs a message based on TR-069 protocol. The corresponding message packets are then forwarded to the DSLAM 303, as indicated in block 602. The DSLAM 303 forwards the message packets via DSL to the IGD 204, as indicated in block 603. The IGD 204 receives the message packets forwarded by the DSLAM 303, as indicated in block 604. The IGD 204 then wirelessly forwards the message packets to the MWCD 102, as indicated in block 605. The MWCD 102 receives the wirelessly transmitted message packets, as indicated in block 606.

Figure 7:
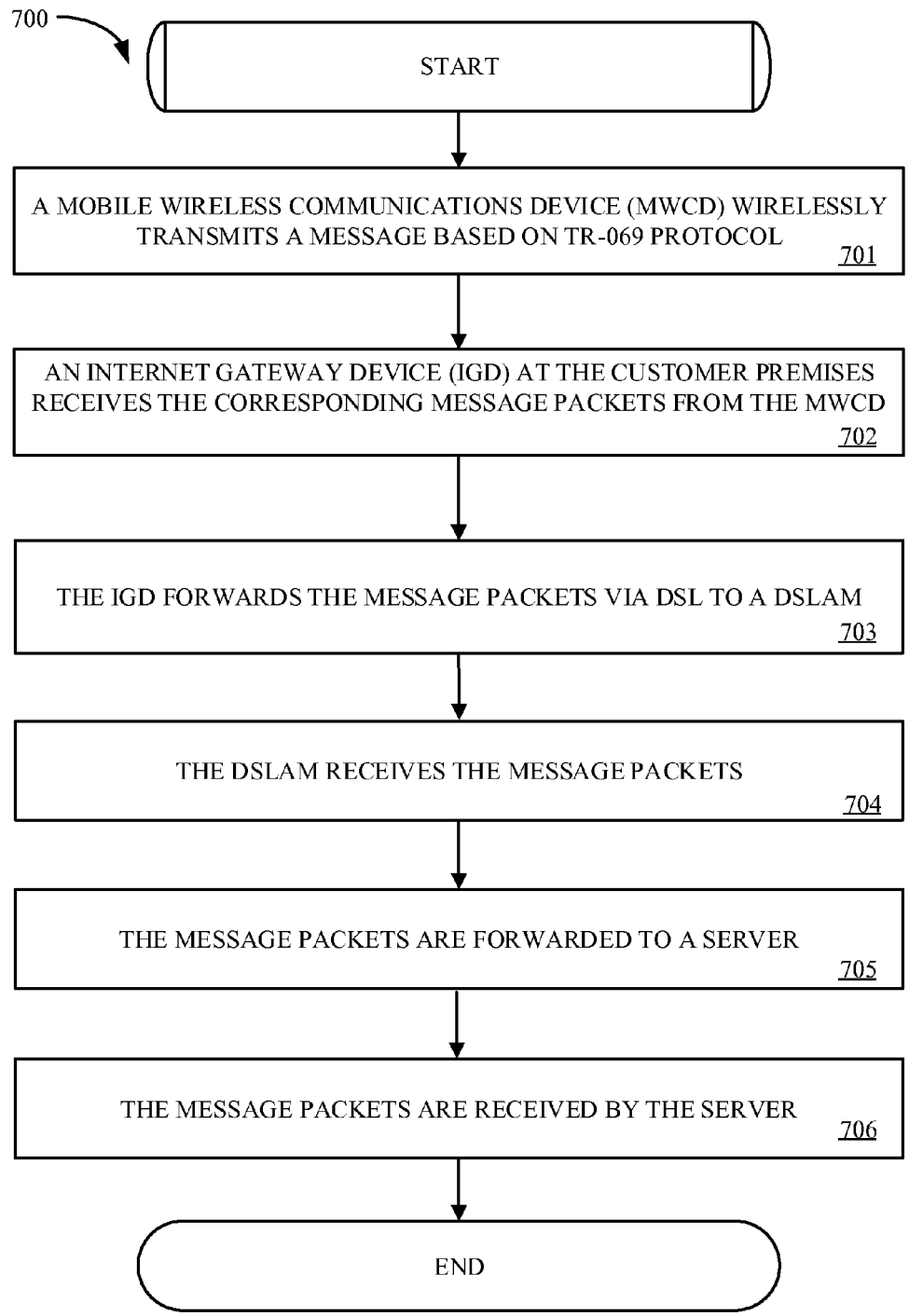
FIG. 7 is a flow chart illustrating another method for communicating with an MWCD, in accordance with exemplary embodiments.

FIG. 7 is a flow chart illustrating a communication method 700, in accordance with exemplary embodiments. The method 700 illustrates an example of steps taken in providing a message from the MWCD 102 to the server 101 via the IGD 204. As indicated in block 701, the MWCD 102 wirelessly transmits a message based on TR-069 protocol. The MWCD 102 may use, for example, a WiFi network to transmit the message. The IGD 204 at the customer premises receives the corresponding message packets from the MWCD 102, as indicated in block 702. The IGD 204 then forwards the message packets via DSL to the DSLAM 303, as indicated in block 703. The DSLAM 303 receives the message packets, as indicated in block 704. The message packets are then forwarded to the server 101, as indicated in block 705. The message packets are then received by the server 101, as indicated in block 706.

Figure 8:
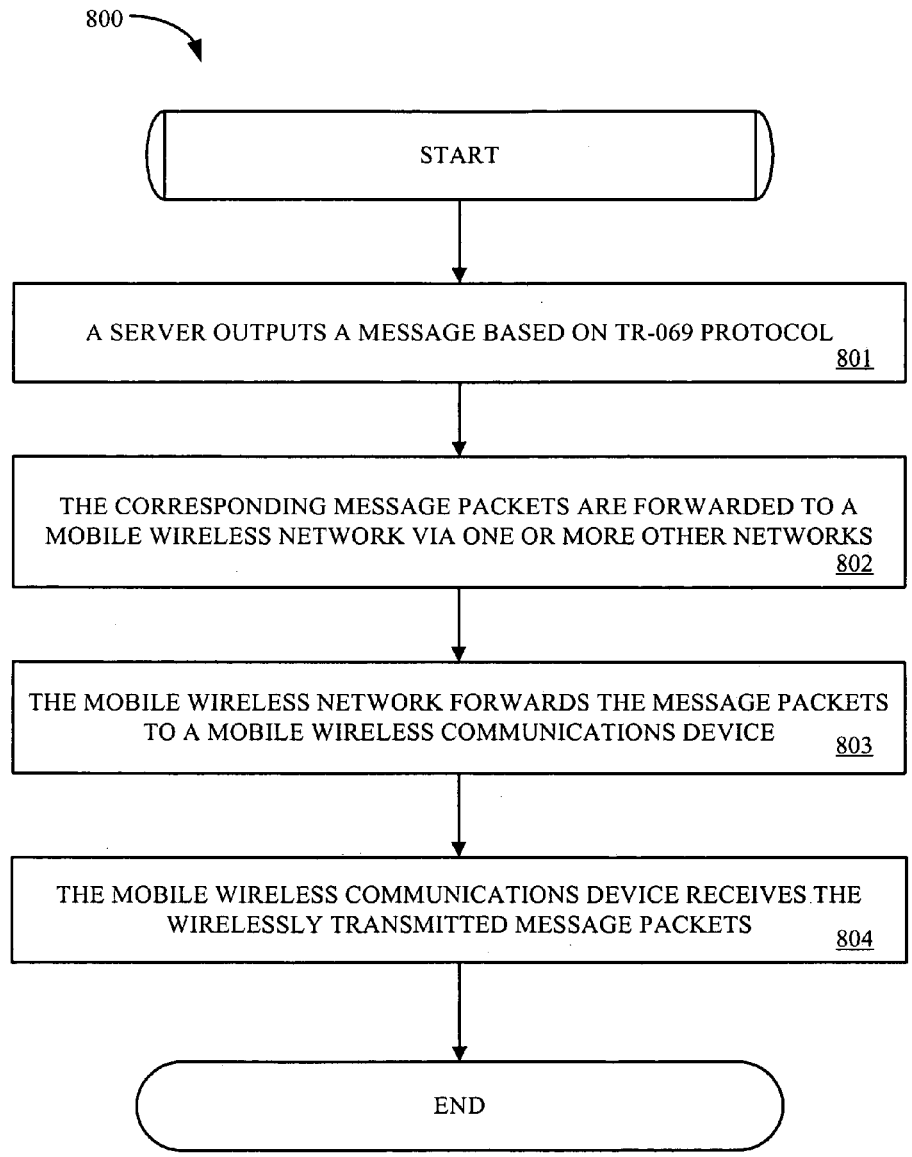
FIG. 8 is a flow chart illustrating yet another method for communicating with an MWCD, in accordance with exemplary embodiments.

FIG. 8 is a flow chart illustrating a communication method 800, in accordance with exemplary embodiments. The method 800 illustrates an example of steps taken in providing a message from the server 101 to the MWCD 102 via a mobile wireless network 404. As indicated in block 801, the server 101 outputs a message based on TR-069 protocol. The corresponding message packets are then forwarded to a mobile wireless network 404 via one or more other networks 403, as indicated in block 802. The one or more other networks, such as the network 403, may include, for example, a PSTN, PLMN, and/or an IP network. The mobile wireless network 404 then forwards the message packets to the MWCD 102, as indicated in block 803, and the MWCD 102 receives the wirelessly transmitted message packets, as indicated in block 804.

Figure 9:
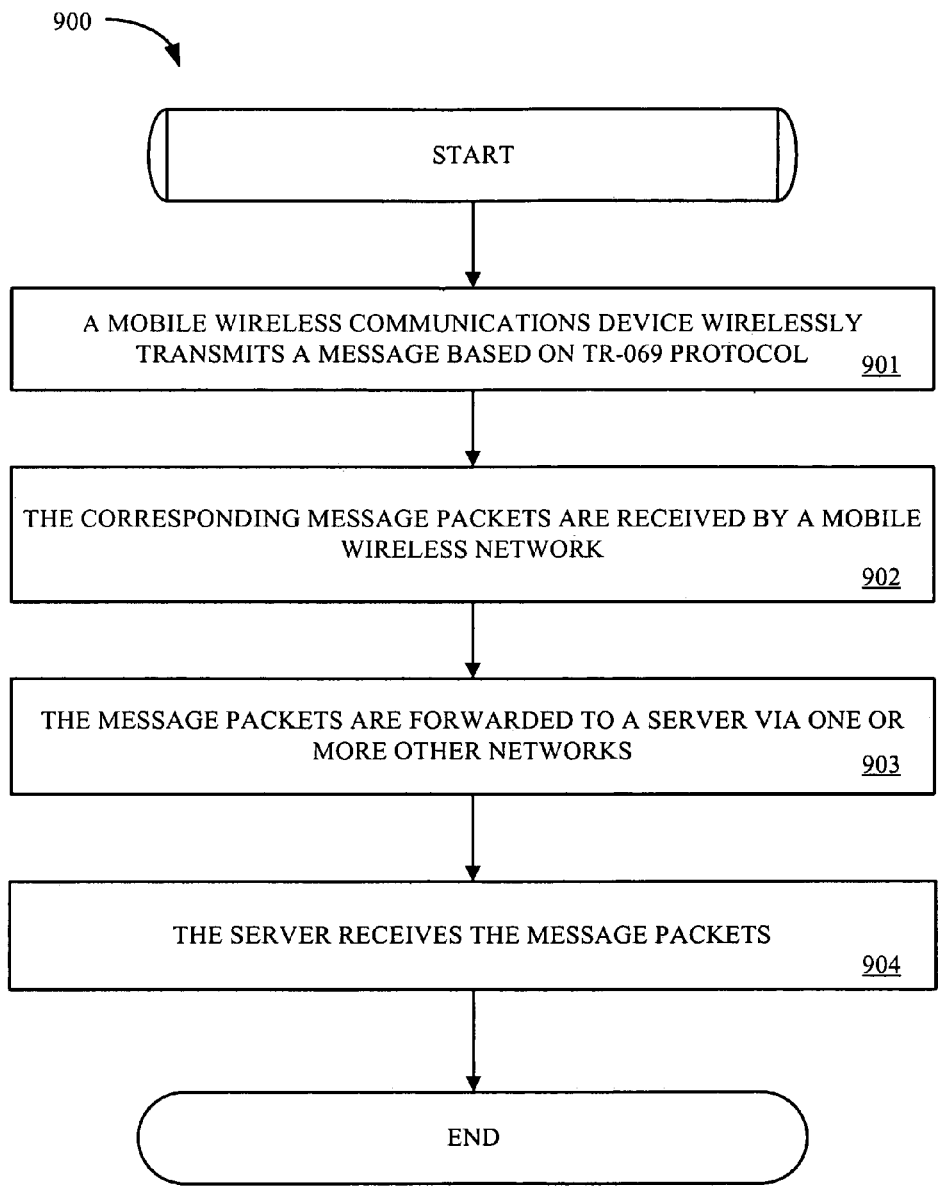
FIG. 9 is a flow chart illustrating a further method for communicating with an MWCD, in accordance with exemplary embodiments.

FIG. 9 is a flow chart illustrating a communication method 900, in accordance with exemplary embodiments. The method 900 illustrates an example of steps taken in providing a message from the MWCD 102 to the server 101 via the mobile wireless network 404. As indicated in block 901, the MWCD 102 wirelessly transmits a message based on TR-069 protocol. The corresponding message packets are then received by a mobile wireless network 404, as indicated in block 902. The mobile wireless network 404 forwards the message packets to the server 101 via one or more other networks, as indicated in block 903. The server 101 then receives the message packets, as indicated in block 904. The one or more other networks may include, for example, a PSTN, PLMN, and/or an IP network.

Figure 10:
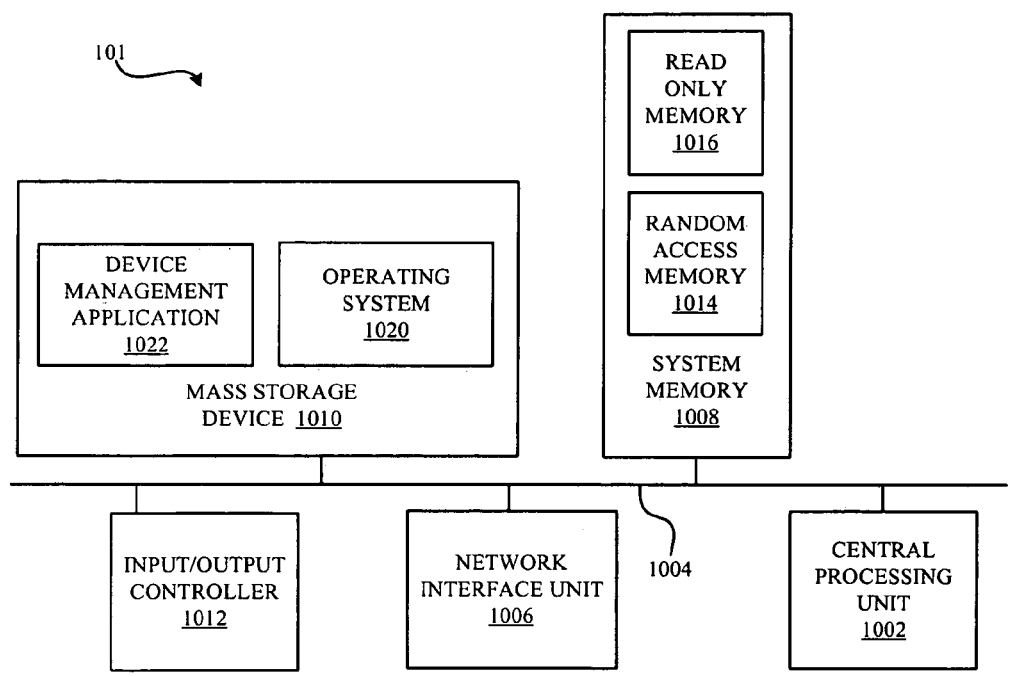
FIG. 10 is a block diagram illustrating a server of the communication system shown in FIG. 1, in accordance with exemplary embodiments.

FIG. 10 is a block diagram illustrating the server 101, in accordance with exemplary embodiments. The server 101 includes a central processing unit 1002 (CPU), a system memory 1008, including a random access memory 1014 (RAM) and a read-only memory (ROM) 1016, and a system bus 1004 that couples the memory 1008 to the CPU 1002. A basic input/output system containing the basic routines that help to transfer information between elements within the server 101, such as during startup, is stored in the ROM 1016. The server 101 further includes a mass storage device 1010 for storing an operating system 1020 and other program modules, which will be described in greater detail below.

The mass storage device 1010 is connected to the CPU 1002 through a mass storage controller (not shown) connected to the bus 1004. The mass storage device 1010 and its associated computer-readable media provide non-volatile storage for the server 101. Although the description of computer-readable media contained herein refers to a mass storage device, such as a hard disk or CD-ROM drive, it should be appreciated by those skilled in the art that computer-readable media can be any available media that can be accessed by the server 101.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the server 101.

According to various embodiments, the server 101 may operate in a networked environment using logical connections to remote computers through a network, such as the Internet. The server 101 may connect to the network through a network interface unit 1006 connected to the bus 1004. It should be appreciated that the network interface unit 1006 may also be utilized to connect to other types of networks and remote computer systems. The server 101 may also include an input/output controller 1012 for receiving and processing input from a number of other devices, including a keyboard, mouse, or electronic stylus (not shown in FIG. 10). Similarly, an input/output controller may provide output to a display screen, a printer, or other type of output device (also not shown in FIG. 10).

As mentioned briefly above, a number of program modules and data files may be stored in the mass storage device 1010 and RAM 1014 of the server 101, including the operating system 1020 suitable for controlling the operation of the server 101. The mass storage device 1010 and RAM 1014 may also store one or more program modules. In particular, the mass storage device 1010 and the RAM 1014 may store a device management application 1022 configured to communicate with and/or manage the MWCD 102 (FIG. 1). Functionality provided by the device management application 1022 in connection with the MWCD 102 includes, for example, auto-configuration and dynamic service provisioning, software and firmware image management, status and performance monitoring, configuration of local and mobile wireless communication settings, and diagnostics. Other program modules may also be stored in the mass storage device 1010 and utilized by the server 101.

Figure 11:
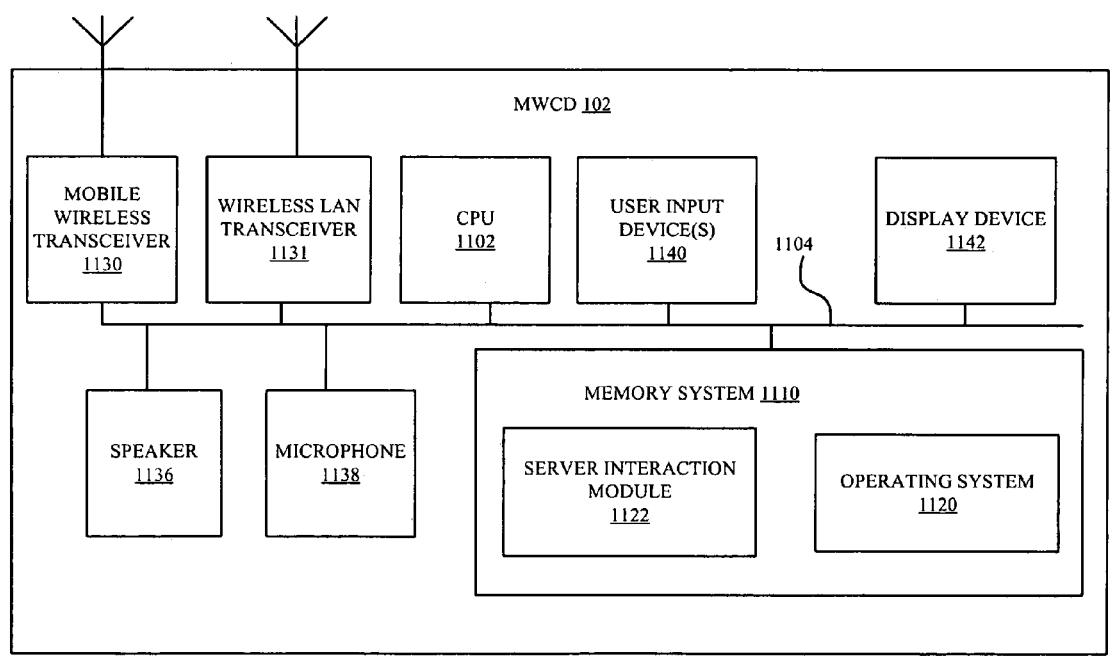
FIG. 11 is a block diagram illustrating a MWCD of the communication system shown in FIG. 1, in accordance with exemplary embodiments.

FIG. 11 is a block diagram illustrating the MWCD 102, in accordance with exemplary embodiments. The MWCD 102 may be, for example, a dual-mode UE. The MWCD 102 includes a central processing unit (CPU) 1102, a memory system 1110, a mobile wireless transceiver 1130, a wireless LAN transceiver 1131, a speaker 1136, a microphone 1138, one or more user input devices 1140, a display device 1142, and a local interface system 1104 that communicatively couples the aforementioned MWCD 102 components.

The user input devices 1140 may include, for example, user input buttons, a keyboard and/or a touch-screen input device. The display device 1142 may be, for example, among others, a liquid crystal display (LCD) device. The microphone 1138 is configured to receive voice signals from an MWCD 102 user, whereas the speaker is configured to output voice signals to the user.

According to exemplary embodiments, the mobile wireless transceiver 1130 is configured to receive and transmit mobile wireless signals using a mobile wireless technology such as, for example, global system for mobile (GSM), universal mobile telephone service (UMTS), time division multiple access (TDMA), code division multiple access (CDMA), wideband CDMA (WCDMA), Cellular Digital Packet Data (CDPD), high-speed downlink packet access (HSDPA), enhanced data rates for GSM evolution (EDGE), or general packet radio services (GPRS). The wireless LAN transceiver 1131 is configured to receive and transmit LAN wireless signals such as via, for example, WiFi technology.

The memory system 1110 is connected to the CPU 1102 through a memory controller (not shown) connected to the bus 1104. The memory system 1110 and its associated computer-readable media provide non-volatile storage for the MWCD 102. The computer-readable media can be any available storage media that can be accessed by the MWCD 102. By way of example, and not limitation, computer-readable media may include volatile and non-volatile, removable and non-removable media implemented in any method or technology for storage of information such as computer-readable instructions, data structures, program modules or other data.

A number of program modules and data files may be stored in the memory system 1110 of the MWCD 102, including an operating system 1120 suitable for controlling the operation of the MWCD 102. The memory system 1110 may also store one or more program modules. In particular, the memory system 1110 may store a server interaction module 1122 configured to communicate with the server 101 using a DSL Form protocol, such as, for example, TR-069. The server interaction module 1122 may establish a session with the server 101 under, for example, one or more of the following conditions: on power-up or reset, once every predetermined time interval (for example, every 24-hours), and responsive to the MWCD 102 receiving a valid connection request from a server 101.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A method for managing a mobile wireless communication device, the method comprising:
   generating, utilizing a server computer, a digital subscriber line forum protocol message, the digital subscriber line forum protocol message comprising a provisioning parameter for provisioning the mobile wireless communication device with a service; and
   outputting, utilizing the server computer, the digital subscriber line forum protocol message to a communications network with instructions to forward the digital subscriber line forum protocol message to a mobile wireless network operating in accordance with a mobile wireless technology for delivery of the digital subscriber forum protocol message to the mobile wireless communication device via a wireless signal transmitted in accordance with the mobile wireless technology to provision the mobile wireless communication device with the service in accordance with the provisioning parameter.

2. The method of claim 1, wherein the mobile wireless communication device is a dual-mode user equipment.

3. The method of claim 1, wherein the mobile wireless technology includes at least one of enhanced data rates for global system for mobile communications evolution and general packet radio services.

4. The method of claim 1, wherein the digital subscriber line forum protocol message is a Technical Report 069 message.

5. The method of claim 1, wherein the service is at least one of the following: a voice communications service, a television service, a data storage service, a web browsing service, a music service, an e-mail service, a voice over internet protocol service, and a text messaging service.

6. A server computer for managing a mobile wireless communication device, the server computer comprising:
   a processor; and
   memory having program instructions stored thereon, the program instructions configured to enable the processor to
      generate a digital subscriber line forum protocol message, the digital subscriber line forum protocol message comprising a provisioning parameter for provisioning the mobile wireless communication device with a service, and
      output the digital subscriber line forum protocol message to a communications network with instructions to forward the digital subscriber line forum protocol message to a mobile wireless network operating in accordance with a mobile wireless technology for delivery of the digital subscriber forum protocol message to the mobile wireless communication device via a wireless signal transmitted in accordance with the mobile wireless technology to provision the mobile wireless communication device with the service in accordance with the provisioning parameter.

7. The server computer of claim 6, wherein the mobile wireless communication device is a dual-mode user equipment.

8. The server computer of claim 6, wherein the mobile wireless technology includes at least one of enhanced data rates for global system for mobile communications evolution and general packet radio services.

9. The server computer of claim 6, wherein the digital subscriber line forum protocol message is a Technical Report 069 message.

10. A non-transitory computer-readable storage medium comprising computer readable instructions that, when executed by a computer, cause the computer to perform a method, comprising:
- generating a digital subscriber line forum protocol message, the digital subscriber line forum protocol message comprising a provisioning parameter for provisioning a mobile wireless communication device with a service; and
- outputting the digital subscriber line forum protocol message to a communications network with instructions to forward the digital subscriber line forum protocol message to a mobile wireless network operating in accordance with a mobile wireless technology for delivery of the digital subscriber forum protocol message to the mobile wireless communication device via a wireless signal transmitted in accordance with the mobile wireless technology to provision the mobile wireless communication device with the service in accordance with the provisioning parameter.

11. The non-transitory computer-readable storage medium of claim 10, wherein the mobile wireless communication device is a dual-mode user equipment.

12. The non-transitory computer-readable storage medium of claim 10, wherein the digital subscriber line forum protocol message is a Technical Report 069 message.

13. The non-transitory computer-readable storage medium of claim 10, wherein the mobile wireless technology includes at least one of enhanced data rates for global system for mobile communications evolution and general packet radio services.

14. The server computer of claim 6, wherein the service is at least one of the following: a voice communications service, a television service, a data storage service, a web browsing service, a music service, an e-mail service, a voice over internet protocol service, and a text messaging service.

15. The non-transitory computer-readable storage medium of claim 10, wherein the service is at least one of the following: a voice communications service, a television service, a data storage service, a web browsing service, a music service, an e-mail service, a voice over internet protocol service, and a text messaging service.

* * * * *